United States Patent Office 3,799,756
Patented Mar. 26, 1974

3,799,756
SUSTAINED ACTION NITROGEN FERTILIZER
Rudolf Keller, Ziegelhausen, and Edmund Hoffmann and Walter Neugebauer, Constance, Germany, assignors to Deutsche Gold- und Silber-Scheideanstalt vormals Roessler, Frankfurt am Main, Germany
No Drawing. Continuation-in-part of abandoned application Ser. No. 827,470, May 9, 1969. This application Jan. 26, 1972, Ser. No. 221,043
Claims priority, application Germany, May 11, 1968, P 17 67 452.1
Int. Cl. C05f 11/00
U.S. Cl. 71—27　　　　　　　　　　　　　　　7 Claims

ABSTRACT OF THE DISCLOSURE

Application to soil of a fertilizing agent which comprises nitrilotriacetonitrile as substantially the sole source of nitrogen in an amount to provide between 0.001 and 1.5 tons of elemental nitrogen per hectare.

CROSS-REFERENCE TO RELATED APPLICATION

This application is a continuation-in-part of application Ser. No. 827,470 and now abandoned, filed by the same inventors on May 9, 1969 in respect of "Sustained Action Nitrogen Fertilizer."

BACKGROUND OF THE INVENTION

The invention relates to a process of furnishing a sustained action nitrogen fertilizer and trace elements to the plant.

As is now common knowledge, plants require a sufficient supply of mineral nutrients for their optimum development. Essential nutrients include both the basic, major nutrients, such as P, K, N or S, as well as the minor or trace element nutrients, such as Mn, Cu, Zn, Fe or Mo. To obtain a desirable plant growth, it is essential that these nutrients are available in an adequate amount and in a form permitting acceptance by the plant during the entire vegetation period.

However, the ideal conditions are very often not present in practical use since, on one hand, many nutrients, because of small solubility or small solubility of their derivatives, are not extracted in sufficient amounts by the water from the soil and, on the other hand, since the plant can only receive dissolved substances, readily soluble substances are often washed out prematurely by excessive amounts of precipitation.

To prevent that nitrogen fertilizers are washed out by atmospheric precipitation condensation products of somewhat lower solubility such as urea and urea-aldehyde condensation products are frequently employed as slow acting fertilizers. The nitrogen content of these products is between about 25 and 40% by weight. This type of fertilizer however has no effect on the supply of the so-called minor or trace nutrients to the plant and besides its solubility is too high to resist rain and other atmospheric action for longer periods of time.

It has also been proposed to make the trace nutrients that are present in the soil in a form of low solubility available to the plant by adding to the soil polyamino carboxylic acids, such as ethylenediaminotetraacetic acid, polyalkylenediaminotetraacetic acid, diethylenetriaminopentaacetic acid, hydroxyethylenediaminotriacetic acid, cyclohexane, 1,2-diaminotetraacetic acid, etc.

Polyaminocarboxylic acids which are well known from analytical chemistry as strong chelate complex forming agents convert the compounds of low solubilities such as phosphates, carbonates and oxides into soluble form and thus make them available from the soil. They thus provide the plant with soluble compositions of the trace elements. In case of phosphates of low solubility, such as iron or manganese phosphate, this procedure will supply the plant, by decomposition of the soil, both with the trace elements iron or manganese and with the major or basic nutrient, phosphorus.

But these polyaminocarboxylic acids have been found to be poor suppliers of nitrogen and on occasion to be even harmful to plants since the acids formed by these fertilizers are not sufficiently decomposed in the soil. This is due to the chemical structure of the polyaminocarboxylic acids.

To obtain a slow release nitrogen fertilizer it has also been proposed to use a source of nitrogen such as urea, and to add thereto nitrilotriacetonitrile (NTN), a monoamino compound. In this combination however the nitrilotriacetonitrile was only used to act as a release retardant. The main source of the nitrogen was the urea or similar compound which therefore had to constitute the by far larger portion of the composition. The amount of nitrilotriacetonitrile was strictly limited since it was feared that otherwise the nitrile would impair the adequate nitrogen supply, which was to come from the urea. Unfortunately, urea by itself has too high a solubility. Therefore the retardation of the release obtained with this combination was quite insufficient, particularly where the fertilizer was intended to last throughout one or several vegetation periods upon a single application only.

The reason why generally, the nitriloacetonitrile was believed to be inadequate to furnish the necessary nitrogen supply was that it was considered to undergo a similar development in the soil as the polyaminocarboxylic acids.

Surprisingly, it has now been found that nitrilotriacetonitrile when used as the sole nitrogen source can provide a sufficient supply of nitrogen together with an extremely slow release action.

SUMMARY OF THE INVENTION

The invention accordingly resides in a fertilizing process in which nitrilotriacetonitrile is used as substantially the sole source of nitrogen.

The invention also embraces a fertilizing agent in which nitrilotriacetonitrile is combined with a plant nutrient and from 5 to 20% by volume of a finely divided large surface silicic acid.

DESCRIPTION OF THE INVENTION AND PREFERRED EMBODIMENTS

The invention is based on the finding that by the process proposed even a single application of the fertilizer can furnish an optimal supply of nitrogen to the plant during one or several vegetation periods and additionally will also make the minor or trace nutrients available to the plant. As already indicated this is due to the fact that the nitrilotriacetonitrile is subject to hydrolysis under the action of the soil humidity and thus is slowly converted to the water soluble ammonium salts of the corresponding acid. The plant is thus supplied in a continuous manner with small amounts of nitrogen and of the trace nutrients that are essential for plant growth. These trace elements become available in the soil by conversion of the substances of low solubility to highly soluble compounds by means of the corresponding aminopolycarboxylic acid which is formed during the hydrolysis and which constitutes a chelate complex-forming agent.

The nitrilotriacetonitrile (NTN) has a high nitrogen content, i.e. a content of 41.8% by weight. It is only slowly dissolved by rain after being embedded in the soil and thus is only slowly passed into the upper layers of the soil because of its low water solubility. It is not therefore washed out rapidly as is the case with nitrogen mineral fertilizers of high solubility such as urea. Its low solubility, on the other hand, prevents also the formation of a too highly concentrated solution in case of insufficient precipitation which might otherwise result in necrosis and burning of the plants.

That the addition of nitrilotriacetonitrile does not have any negative effect on the plant growth and does not interfere with the soil flora and fauna was all the more surprising and unexpected since nitriles are commonly considered poisonous because of their relationship to hydrocyanic acid. Actually, the double action of the hydrolysis products of NTN which is of such value to the plant growth is in no way affected by the chemical nature of the compound.

NTN, similar to the other sustained-action nitrogen fertilizers, is preferably employed in amounts between 0.001 and 1.5 tons of elemental nitrogen per hectare (2.471 acres). The upper limit depends however on the type of plant for which the fertilizer is used. The fertilizer can be used either prior to the seeding and planting of the plants or later as a top dressing.

NTN can be made at comparatively low cost from rather inexpensive raw materials with present mechanical methods. It can for instance be formed by reacting ammonia with hydrocyanic acid and formaldehyde.

It has also been found that NTN has a beneficial effect in the form of an increase of the fertilizer action of certain conventional fertilizers, if it is employed in combination with, for instance, quick-acting fertilizers, such as phosphates.

If the problem is to treat a soil in which the trace nutrients are entirely absent, a combination can be used of NTN with substances of low solubility which contain the trace nutrients and will thus make these trace elements available to the plant throughout the entire vegetation period. Of particular usefulness for a combination of this type is for instance Thomas phosphate slag.

A still further increase of the sustained action or slow release can be obtained by mixing the NTN in powdery form with a known release retarder such as finely distributed silicone dioxide containing large surface materials in amounts from 5 to 50 vol. percent. The effect of this addition is due to the high sorption action of the $SiO_2$ for liquid or gaseous decomposition products. This mixture is of particular value wherever the fertilizer is applied to a highly water permeable soil.

Preferred as large-surface materials are for instance silicic acids that are obtained by wet precipitation or similarly obtained silicates or silicic acids which are obtained by a pyrogenic process. These types of large-surface materials are well known today as fillers in polymeric materials and elastomers and as thickeners in liquids such as lacquers, solvents, etc.

It is preferred to employ the NTN, with or without additives, in the form of granulates in particular in pearl form. The granulates can be obtained from the molten stage, from a solution or by pelletizing. By varying the ratio of grain size to surface in the sustained action fertilizer, the rate of dissolution of the fertilizer under the action of water in the form of rain or soil humidity can easily be controlled.

A controlled, graduated sustained action can furthermore be obtained by adding a component having a water solubiilty substantially different from that of the NTN. Such additives are for instance water repellent silicones.

The possibility to vary the slow release effect in case of sustained action fertilizers is of particular interest in view of the wide divergence of requirements in agriculture and forestery. Thus, an extremely slow release of the effective agents to the soil is desirable in forest fertilizing, where an annual repetition of the fertilizing program is too expensive if large forest areas are involved.

It will be understood though that the results of the new concept of the invention will show up in an increased timber production only in a number of years because of the comparatively slow growth of the tree flora. However, fertilizing of forests has been carried out on a large scale already in Scandinavian countries and in South Africa and has had remarkable success there. Efforts in central Europe are mainly concerned with coniferous trees, particularly fir and pine trees, and more recently with Douglas firs and, insofar as deciduous trees are concerned, with poplar trees.

The essential nutrients which must be supplied to the forest soil are N, P and Ca, nitrogen being the most important element. In order to obtain an optimum metabolic process in the leaf, it is preferable and customary to add nitrogen to the soil together with phosphorous. The usually employed fertilizers in this case are superphosphate, potassium ammonium nitrate and urea. The results, particularly in case of urea, were not as desired because too much of the material was washed out by precipitation. This brought about a demand for a fertilizer with long sustained action.

So far the materials available for this purpose were mainly urea condensation resins. However, the process of making these materials, particularly in the case of polymeric urea-formaldehyde resin compositions, does not produce uniform quality. On the other hand, with other materials such as crotonylidene diurea resin the cost is too high for use as a forest fertilizer because of the large amounts of material required. In addition, not every sustained action fertilizer is suited for fertilizing forests because of the special composition of forest soil with its high humus content.

The nutrients and trace elements are bound in complexes by the polymeric humic acids in the humus and can be received by the root only with great difficulty. It is therefore desirable to have a sustained action fertilizer which can prevent or reduce the binding action of the humic acids.

In this respect it has been found that since nitrilotriacetic acid, the intermediate product in the NTN degradation, has the property of forming complexes it is thus possible to bring the substances into solution which are normally tied down by the weaker humic acids, a process called mineralization. These substances can then be supplied to the roots of the trees.

Although the nitrilotriacetic acid formed in the nitrile hydrolysis is not subject to unlimited storage in the soil but in turn, is subject to microbial decomposition, its decomposition rate is slow. The half-time of the decomposition is about 100 days. The fact that the nitrilotriacetic acid is formed in the nitrile hydrolysis only at a slow rate of speed assures that the plant remains supplied throughout the entire vegetation period or several such periods with the necessary trace nutrients.

The process of the invention is therefore particularly useful for forest fertilizing to provide both a sustained action nitrogen fertilizer and a "mineralizor." This applies in particular to the product when used in pearl form, since in this form the product has a slow rate of dissolution because of the small ratio of surface to volume and also because of its smooth surface. This makes the material particularly desirable for spraying from an airplane which requires penetration through foliage.

The excellent fertilizer action of NTN can easily be shown by simple tests with potted plants. The test plants in the following experiments were the so-called German Weidelgras (*Lolium perenne* L.) and oats. In case of the grass, harvesting was effected several times during one vegetation period. This permitted to trace the sustained action of the fertilizer. The tests with oats, on the other hand, showed the excellent action on NTN with regard to grain production.

The tests in each case were carried out with an average and with a lean garden soil in order to show the complex formation of the nitrile.

EXAMPLE 1

Equal amounts of grass seed were planted into a series of pots of even size in the middle of May. The nitrilotriacetonitrile was then added after about 5 weeks in an amount corresponding to 0.5 ton of elemental nitrogen per hectare of soil (2.471 acres).

The water supply was adjusted to an amount of 60% of the maximum water absorptive capacity of the soil. The test period lasted until November, and during this period there were effected three cuttings. The production obtained is shown in the following Table 1.

The table shows that the use of nitrilotriacetonitrile results in a production increase compared to the control test of between 2½ and 3 times. The production figures in the table are stated in grams of freshly harvested substance per flower bud.

TABLE 1

| Soil | Test compound | Production | | |
|---|---|---|---|---|
| | | First cutting July 19 | Second cutting Sept. 8 | Third cutting Oct. 26 |
| Average garden soil | Control (without N-fertilizer) | 14.5 | 8.5 | 2.7 |
| | Nitrilotriacetonitrile | 51.9 | 17.0 | 6.9 |
| Lean garden soil | Control (without N-fertilizer) | 11.6 | 7.5 | 2.9 |
| | Nitrilotriacetonitrile | 37.6 | 13.3 | 5.9 |

EXAMPLE 2

The nitrilotriacetonitrile was added in the test series of this example to an average and lean garden soil in an amount corresponding to 0.4 g. of elemental nitrogen per liter of soil and this was done prior to the planting of the plant which was German Weidelgras, a type of grass which has previously been identified by its Latin name.

The seeding was effected in the third week of July. The grass was cut altogether twice and weighed each time. The production in grams is shown in the following Table 2.

The table shows the excellent effects of the nitrile upon the plant growth.

TABLE 2

| Soil | Test compound | Production | | |
|---|---|---|---|---|
| | | First cutting Sept. 8 | Second cutting Oct. 26 | Total |
| Average garden soil | Control (without N-fertilizer) | 7.1 | 4.1 | 11.1 |
| | Nitrilotriacetonitrile | 15.0 | 17.2 | 32.6 |
| Lean garden soil | Control (without N-fertilizer) | 10.1 | 4.0 | 14.2 |
| | Nitrilotriacetonitrile | 13.3 | 18.3 | 31.2 |

EXAMPLE 3

The plant tests in this example were carried out with oat as the test plants and otherwise followed the same lay-out as Example 1. Nitrilotriacetonitrile was added in this case also about 5 weeks after planting. The amount of nitrile likewise corresponded to 0.5 ton of elemental nitrogen per hectare (2.471 acres) of soil.

The oat was cut and dried 98 days after the addition of the nitrile and 135 days after seeding. The production in grain and stalks (straw) is shown in the following Table 3. The production figures are stated in grams of dry substance per flower bud.

TABLE 3

| Soil | Test compound | Production | |
|---|---|---|---|
| | | Grain | Stalks |
| Average garden soil | Control (without N-fertilizer) | 2.1 | 4.4 |
| | Nitrilotriacetonitrile | 3.6 | 7.7 |
| Lean garden soil | Control (without N-fertilizer) | 1.2 | 2.7 |
| | Nitrilotriacetonitrile | 4.9 | 6.9 |

EXAMPLE 4

In order to compare the slow-release effects of nitrilotriacetonitrile (NTN), ethylenediaminotriacetonitrile (EDTN) and diethylenetriaminopentaacetonitrile (DTPN), the following tests were carried out with German Weidelgras (*Lolium perenne* L.) in flower pots.

The fertilizer was applied as a granulated top dressing in two different series distinguished by the amount of fertilizer. One series involved 0.226 g. N/pot while the other series involved 0.439 g. N/pot. Each series was washed three times with an excess of water. The amount of water was such that in each case about 300 ml. of water were drained from each pot. There was also a control test in which unfertilized pots were used. These were not subjected to any washing with water.

The general lay-out of the tests was as follows:

Apr. 21: seeding of about 0.75 g. of seed of German Weidelgras/pot

May 25/26: preliminary cut ("zero cut"), in order to start the harvesting tests from the same basis prior to applying the top dressing June 1/2: top dressing; each individual test was carried out in five specimens June 16/18: first washing with water June 21/23: first cut July 21/22: second cut Aug. 3/4: second washing with water Sept. 7/8: third cut Sept. 14/15: third washing Oct. 13/14: fourth cut.

The following table shows the production obtained in grams of hay per pot.

TABLE
[Relative weights of hay collected]

| Nitrogen (g./pot) | Fertilizer | Cut | | | | Total |
|---|---|---|---|---|---|---|
| | | 1 June 22/23 | 2 July 21/22 | 3 Sept. 7/8 | 4 Oct. 13/14 | |
| | Not fertilized. | 33.4 | 16.4 | 26.4 | 23.8 | 100 |
| 0.226 | NTN | 35.1 | 24.4 | 59.2 | 15.2 | 134.6 |
| | EDTN | 31.7 | 14.9 | 26.8 | 19.4 | 92.2 |
| | DTPN | 37.6 | 21.5 | 32.1 | 28.2 | 119.8 |
| 0.439 | NTN | 37.6 | 35.2 | 74.2 | 27.6 | 174.4 |
| | EDTN | 29.8 | 16.7 | 36.4 | 24.3 | 107.2 |
| | DTPN | 36.3 | 21.0 | 41.3 | 23.8 | 122.4 |

As can be seen from the table, both EDTN and DTPN did not result in a substantial increase of the production as against the unfertilized plants. It is noted that these tests all involved the use of only the specified substances as nitrogen fertilizers. No separate nitrogen supply was added.

In one case, that of EDTN, it will be noted that there even occurred a decrease of the yield as compared with the non-fertilized plants. Only NTN resulted in a substantial increase of the production. This was particularly the case where a larger amount of the fertilizer was used in order to supply the stated larger amount of nitrogen.

From these tests, it can only be concluded that EDTN and DTPN are by far not as active in their slow nitrogen release as NTN. It is believed that this is due to too high a concentration of EDTN and DTPN or metal chelate compounds formed thereby. This in turn is undoubtedly due to the fact that the acids formed by these latter two fertilizers are not decomposed or not decomposed sufficiently in the soil. This then causes a lower fertilizing effect or may even have some damaging action, as compared with NTN which is completely decomposed. To prove this point, the soil fertilized with NTN was examined at the end of the tests and it was found that only traces of the free nitrilo-triacetic acid could be found.

What is claimed is:

1. The process of improving the fertility of soil for an extended period of time, which comprises applying to the soil a fertilizing agent comprising nitrilotriacetonitrile in granular form as substantially the sole source of nitrogen in an amount to provide between 0.001 and 1.5 tons of elemental nitrogen per hectare.

2. A process as defined in claim 1, in which the fertilizing agent comprising nitrilotriacetonitrile in granular form is in the form of pearls.

3. The process of claim 1, wherein the said fertilizing agent further includes powdery finely divided large-surface silicic acid in an amount of 5–20% by volume relative to the amount of said nitrile.

4. The process of claim 3, wherein the large-surface silicic acid is a wet-precipitated finely divided silicic acid.

5. The process of claim 3, wherein the large-surface silicic acid is a finely divided fume silica.

6. The process of claim 1, wherein the said fertilizing agent further includes a water repellent silicone.

7. A fertilizer in granular form comprising nitrilotriacetonitrile as the sole source of nitrogen, a plant nutrient and from 5 to 20% by volume relative to the nitrile of a finely divided large surface silicic acid.

References Cited
UNITED STATES PATENTS

| | | | |
|---|---|---|---|
| 3,427,144 | 2/1969 | Kapar | 71—28 |
| 3,290,158 | 12/1966 | Treat | 71—62 X |
| 3,679,391 | 7/1972 | Jack et al. | 71—64 E |

CHARLES N. HART, Primary Examiner

R. BARNES, Assistant Examiner

U.S. Cl. X.R.

71—62, 64 F